UNITED STATES PATENT OFFICE.

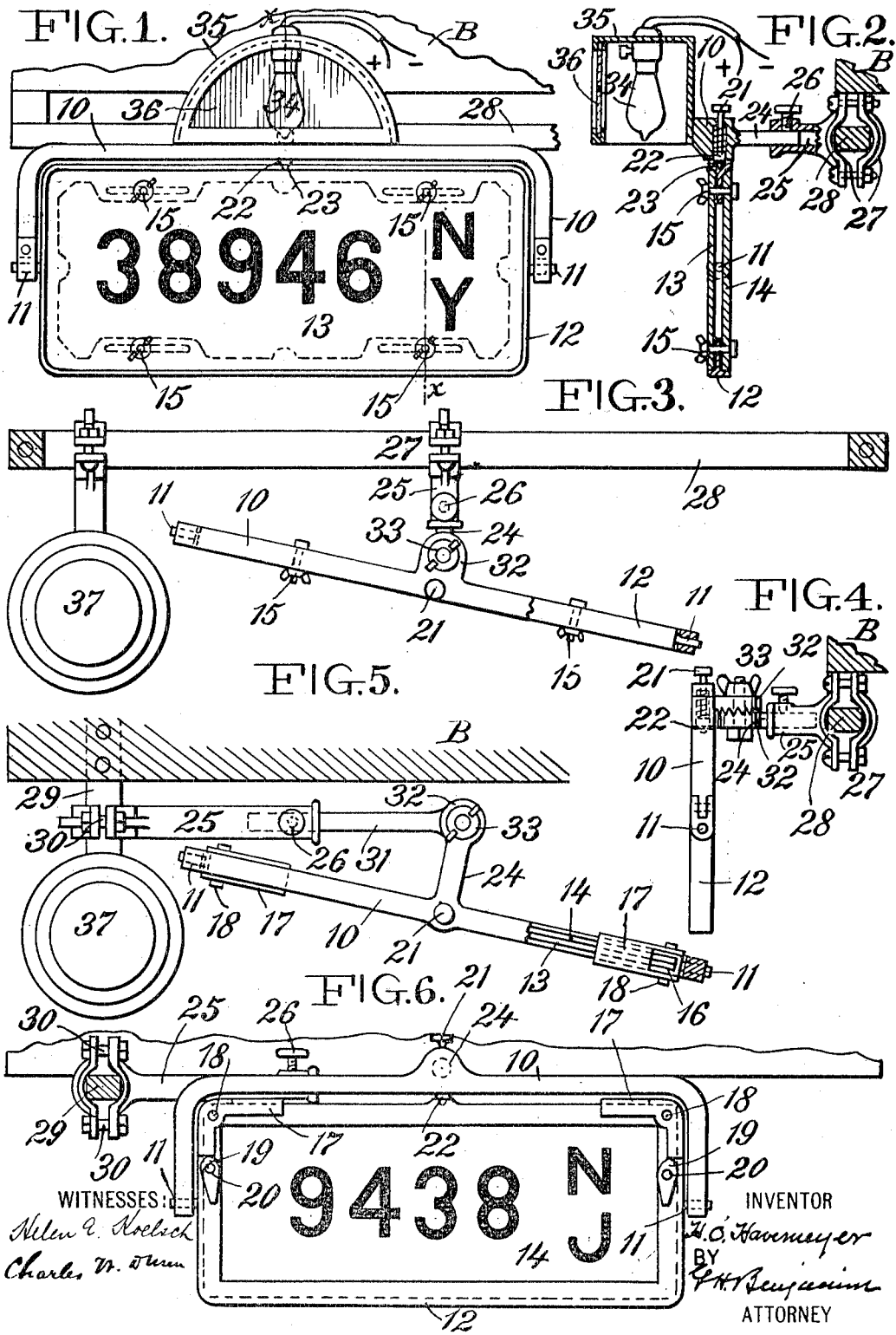

HENRY OSBORNE HAVEMEYER, OF MAHWAH, NEW JERSEY.

AUTOMOBILE SIGN-HOLDER.

1,080,631.  Specification of Letters Patent.  Patented Dec. 9, 1913.

Application filed December 27, 1910. Serial No. 599,587.

*To all whom it may concern:*

Be it known that I, HENRY OSBORNE HAVEMEYER, a citizen of the United States, residing at the city of Mahwah, county of Bergen, and State of New Jersey, have invented certain new and useful Improvements in Automobile Sign-Holders, of which the following is a specification.

My invention consists in an automobile sign holder, which may be readily connected to and adjusted in position on an automobile, and which may be reversed to display one of two number plates of adjacent States.

The accompanying drawings will serve to illustrate my invention, in which,

Figure 1 is a front view. Fig. 2 a vertical section on the line X—X, with an electric illuminating device. Figs. 3 and 4 are respectively a plan view and vertical section of a modification, with an oil illuminating device, and showing means for giving an angular position to the sign. Figs. 5 and 6 are modifications showing respectively a plan and front view.

In the drawings, 10 indicates a holder. Pivotally mounted in this holder at 11, is a frame 12, to which number plates 13—14 may be secured by thumb screws 15, or alternatively, the frame 12 may be slotted as shown at 16 (Fig. 5) and the number plates 13—14 held therein by end pieces 17, pivoted at 18 to the frame and secured in position by cams 19 pivoted to the frame at 20.

I do not limit myself to any particular means for securing the number plates to the frame. The two means shown, as described, however, are found to be well adapted for the purpose.

Mounted in the upper side of the holder 10 is a spring pin 21, the lower end of which, 22, is adapted to enter a cavity 23 in the upper surface of the frame 12. Extending rearwardly from the holder 10 is an arm 24 adapted to be adjustably secured in the hollow supporting arm 25 (Figs. 2, 3, 4) by means of a screw 26. The rear end of the hollow supporting arm 25 is formed of a two piece strap 27 which may be secured to a bar 28 extending across the body of the automobile B, or a bar 29 projecting from the back of the automobile and secured in position therein by means of bolts 30. In order to provide for an angular position of the holder 10, there may be introduced between the holder 10 and the arm 24, or the arm 24 and the supplemental arm 31, two superposed serrated plates 32 and a thumb-screw 33.

As a means for illuminating the number plates I may use an electric light 34, mounted in a frame 35 provided with a transparent face 36 and connected to the front of the holder 10 (Fig. 2), or I may use the usual form of oil lamp 37 (Figs. 3 and 5).

I do not limit myself in any wise to the means employed for attaching the holder to a vehicle as the variations in construction of automobiles provide different means of support. Thus, number plates may be attached to the front of an automobile by securing the strap to the water-cap of the radiator or the axle, front or rear, or any suitable portion of the machine, as desired.

When it is desired to change the number plates, spring pin 21 is lifted and the frame reversed from the position where it shows, for instance, the New York number (Fig. 1) to show the New Jersey number plate (Fig. 6).

Having thus described my invention, I claim:

An automobile sign, comprising a tubular main supporting arm, means for securing said supporting arm upon a vehicle, an adjustable arm mounted in said tubular arm, a sign holder carried by said adjustable arm, a reversible sign support, and a series of signs mounted in said support.

In testimony whereof, I affix my signature, in the presence of two witnesses.

HENRY OSBORNE HAVEMEYER.

Witnesses:
T. S. HAVEMEYER,
E. PORTER, Jr.

Copies of this patent may be obtained for five cents each, by addressing the "Commissioner of Patents, Washington, D. C."